United States Patent
Kwon et al.

(10) Patent No.: US 10,581,110 B2
(45) Date of Patent: Mar. 3, 2020

(54) POSITIVE ELECTRODE ACTIVE MATERIAL FOR SECONDARY BATTERY, METHOD OF PREPARING THE SAME, AND SECONDARY BATTERY INCLUDING THE POSITIVE ELECTRODE ACTIVE MATERIAL

(71) Applicant: LG Chem, Ltd., Seoul (KR)

(72) Inventors: Yong Hoon Kwon, Daejeon (KR); Ki Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 68 days.

(21) Appl. No.: 15/567,213

(22) PCT Filed: Apr. 29, 2016

(86) PCT No.: PCT/KR2016/004498
§ 371 (c)(1),
(2) Date: Oct. 17, 2017

(87) PCT Pub. No.: WO2016/175597
PCT Pub. Date: Nov. 3, 2016

(65) Prior Publication Data
US 2018/0108940 A1    Apr. 19, 2018

(30) Foreign Application Priority Data

Apr. 30, 2015   (KR) .................. 10-2015-0061836
Apr. 29, 2016   (KR) .................. 10-2016-0052634

(51) Int. Cl.
*H01M 10/052*   (2010.01)
*H01M 10/0525*  (2010.01)
(Continued)

(52) U.S. Cl.
CPC ........ *H01M 10/0525* (2013.01); *C01G 53/50* (2013.01); *H01M 4/131* (2013.01);
(Continued)

(58) Field of Classification Search
CPC ...... H01M 4/131; H01M 4/466; H01M 4/505; H01M 4/525; H01M 10/052;
(Continued)

(56) References Cited

U.S. PATENT DOCUMENTS

2009/0029253 A1   1/2009   Itou et al.
2013/0202966 A1   8/2013   Yu et al.
(Continued)

FOREIGN PATENT DOCUMENTS

JP   2013517599 A   5/2013
JP   2014506388 A   3/2014
(Continued)

OTHER PUBLICATIONS

Machine translation of KR 10-2013-0138147 (no date).*
(Continued)

*Primary Examiner* — Amanda C. Walke
(74) *Attorney, Agent, or Firm* — Lerner, David, Littenberg, Krumholz & Mentlik, LLP

(57) ABSTRACT

The present invention provides a positive electrode active material for a lithium secondary battery, which includes a secondary particle core formed by agglomeration of primary particles of a nickel manganese cobalt-based first lithium composite metal oxide, an intermediate layer disposed on the core and including rod-shaped nickel manganese cobalt-based second lithium composite metal oxide particles radially oriented from a center of an active material particle to a surface thereof, and a shell disposed on the intermediate layer and including a nickel manganese cobalt-based third lithium composite metal oxide, and a lithium secondary battery including the same.

18 Claims, 7 Drawing Sheets

(51) Int. Cl.
*H01M 4/36* (2006.01)
*H01M 4/505* (2010.01)
*C01G 53/00* (2006.01)
*H01M 4/131* (2010.01)
*H01M 4/525* (2010.01)
*H01M 4/02* (2006.01)

(52) U.S. Cl.
CPC ........... *H01M 4/366* (2013.01); *H01M 4/505* (2013.01); *H01M 4/525* (2013.01); *C01P 2004/03* (2013.01); *C01P 2004/04* (2013.01); *C01P 2004/50* (2013.01); *C01P 2006/40* (2013.01); *H01M 10/052* (2013.01); *H01M 2004/028* (2013.01)

(58) Field of Classification Search
CPC ........... H01M 10/0525; C01P 2004/03; C01P 2004/04; C01P 2004/40; C01P 2004/50
USPC ........................................ 429/322
See application file for complete search history.

(56) References Cited

U.S. PATENT DOCUMENTS

| | | | |
|---|---|---|---|
| 2014/0027670 A1 | 1/2014 | Sun et al. | |
| 2014/0093786 A1* | 4/2014 | Ito | H01M 4/62 429/322 |
| 2014/0131616 A1 | 5/2014 | Sun et al. | |
| 2014/0158932 A1 | 6/2014 | Sun et al. | |
| 2014/0356713 A1 | 12/2014 | Sun et al. | |
| 2015/0053890 A1 | 2/2015 | Sun | |
| 2016/0049647 A1* | 2/2016 | Park | H01M 4/366 429/209 |
| 2016/0093885 A1* | 3/2016 | Kamata | H01M 4/485 429/223 |
| 2016/0190573 A1 | 6/2016 | Sun et al. | |
| 2017/0338488 A1* | 11/2017 | Sun | C01G 53/50 |
| 2018/0013129 A1* | 1/2018 | Lee | H01M 2/10 |
| 2018/0048015 A1* | 2/2018 | Lee | H01M 2/10 |
| 2018/0159128 A1* | 6/2018 | Kim | C01G 53/006 |
| 2018/0212237 A1* | 7/2018 | Lee | H01M 4/0435 |
| 2018/0287135 A1* | 10/2018 | Shin | C01G 53/50 |
| 2019/0036112 A1* | 1/2019 | Aida | H01M 4/36 |
| 2019/0173076 A1* | 6/2019 | Kim | H01M 4/131 |

FOREIGN PATENT DOCUMENTS

| | | | |
|---|---|---|---|
| JP | 2014067645 A | 4/2014 | |
| KR | 20050083869 A | 8/2005 | |
| KR | 20110083383 A | 7/2011 | |
| KR | 20130080565 A | 7/2013 | |
| KR | 20130111413 A | 10/2013 | |
| KR | 20130138073 A | 12/2013 | |
| KR | 20140092492 A | 7/2014 | |
| KR | 10-2013-0138147 A * | 4/2015 | H01M 4/525 |
| WO | 2006118279 A1 | 11/2006 | |
| WO | 2014104811 A1 | 7/2014 | |
| WO | 2015016647 A1 | 2/2015 | |

OTHER PUBLICATIONS

Machine translation of KR 10-2013-0111413 (no date).*
Extended European Search Report for Application No. EP16786783.7 dated Mar. 28, 2018.
Hyung-Joo Noh et al., "Cathode Material with Nanorod Structure—An Application for Advanced High-Energy and Safe Lithium Batteries", Chemistry of Materials, May 28, 2013, vol. 25, No. 10, pp. 2109-2115, XP055181288.
Jang-Yeon Hwang et al., "Radially aligned hierarchical columnar structure as a cathode material for high energy density sodium-ion batteries", Nature Communications, Apr. 2015, vol. 6, No. 1, XP055446508.
Search report from International Application No. PCT/KR2016/004498, dated Jul. 29, 2016.

* cited by examiner

POSITIVE ELECTRODE ACTIVE MATERIAL FOR SECONDARY BATTERY, METHOD OF PREPARING THE SAME, AND SECONDARY BATTERY INCLUDING THE POSITIVE ELECTRODE ACTIVE MATERIAL

CROSS-REFERENCE TO RELATED APPLICATIONS

The present application is a national phase entry under 35 U.S.C. § 371 of International Application No. PCT/KR2016/004498 filed Apr. 29, 2016, which claims priority from Korean Patent Application No. 10-2015-0061836, filed Apr. 30, 2015 and Korean Patent Application No. 10-2016-0052634, filed Apr. 29, 2016, all of which are hereby incorporated herein by referenced.

TECHNICAL FIELD

The present invention relates to a positive electrode active material for a secondary battery, a method of preparing the same, and a secondary battery including the positive electrode active material for a secondary battery.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite oxide of $LiCoO_2$ having a high operating voltage and excellent capacity characteristics has been mainly used. However, since the $LiCoO_2$ has very poor thermal properties due to an unstable crystal structure caused by lithium deintercalation and is expensive, there is a limitation in using a large amount of the $LiCoO_2$ as a power source for applications such as electric vehicles.

Lithium manganese composite oxides ($LiMnO_2$ or $LiMn_2O_4$), lithium iron phosphate compounds ($LiFePO_4$, etc.), or lithium nickel composite oxides ($LiNiO_2$, etc.) have been developed as materials for replacing the $LiCoO_2$. Among these materials, research and development of the lithium nickel composite oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery.

Accordingly, a method of substituting a portion of nickel (Ni) with cobalt (Co) or manganese (Mn) has been proposed as a method to improve low thermal stability while maintaining the excellent reversible capacity of the $LiNiO_2$. However, with respect to $LiNi_{1-x}Co_xO_2$ (x=0.1 to 0.3) in which a portion of nickel is substituted with cobalt, excellent charge and discharge characteristics and life characteristics are obtained, but thermal stability may be low. Also, with respect to a nickel manganese-based lithium composite metal oxide, in which a portion of Ni is substituted with Mn having excellent thermal stability, and a nickel manganese cobalt-based lithium composite metal oxide (hereinafter, simply referred to as "NMC-based lithium oxide") in which a portion of Ni is substituted with Mn and Co, output characteristics are low, and there is a concern that metallic elements may be eluted and battery characteristics may be degraded accordingly.

In order to address the above limitations, a lithium transition metal oxide having a concentration gradient of a metal composition has been proposed. This method is performed by synthesizing a core material, coating the outside of the core material with a material having a different composition to prepare a double layer, mixing the double layer with a lithium salt, and then performing a heat treatment. In this method, metal compositions of the core and the outer layer may be differently synthesized during the synthesis, but, since the formation of a continuous concentration gradient of the metal composition in the formed positive electrode active material is not sufficient, an effect of improvement in the output characteristics may be unsatisfactory and reproducibility may be low.

As another method, research to increase the amount of Ni in the NMC-based lithium oxide has been conducted to achieve high energy density in batteries for small cars and batteries for electric power storage. In general, capacity of a positive electrode active material, lifetime, or stability is in a trade-off relationship in which the lifetime and stability of the battery are rapidly reduced if the capacity is increased. Accordingly, a method of using the NMC-based lithium oxide only in limited composition and voltage range, a method of stabilizing a structure to a limited extent by substituting some compositions of the NMC-based lithium oxide with a heterogeneous element, and a method of reducing a surface side reaction through coating have been proposed. However, all of these methods have limitations in fundamentally improving electrochemical and thermal stabilities of the active material, and, since performance degradation is accelerated at a high voltage, there has been a difficulty in achieving the high energy density in the battery.

DISCLOSURE OF THE INVENTION

Technical Problem

An aspect of the present invention provides a positive electrode active material for a secondary battery in which high capacity may be achieved, excellent life characteristics and stability may be obtained, and there is no performance degradation even at a high voltage.

Another aspect of the present invention provides a method of preparing the above-described positive electrode active material.

Another aspect of the present invention provides a positive electrode including the positive electrode active material.

Another aspect of the present invention provides a lithium secondary battery including the positive electrode.

Technical Solution

According to an aspect of the present invention, there is provided a positive electrode active material for a lithium secondary battery including: a secondary particle core formed by agglomeration of primary particles of a nickel manganese cobalt-based first lithium composite metal oxide; an intermediate layer disposed on the core and including rod-shaped nickel manganese cobalt-based second lithium composite metal oxide particles radially oriented from a center of an active material particle to a surface thereof; and a shell disposed on the intermediate layer and including a nickel manganese cobalt-based third lithium composite metal oxide.

According to another aspect of the present invention, there is provided a method of preparing a positive electrode active material for a lithium secondary battery including: preparing a metal salt solution for forming a core which includes nickel, cobalt, and manganese, and a metal salt solution for forming a shell which includes nickel, cobalt, and manganese in a concentration different from that of the metal salt solution for forming a core; preparing a positive electrode active material precursor by adding a chelating agent and a basic aqueous solution as well as the metal salt solution for forming a shell to the metal salt solution for forming a core to allow a mixing ratio of the metal salt solution for forming a core to the metal salt solution for forming a shell to be gradually changed from 100 vol %:0 vol % to 0 vol %:100 vol %; and mixing the positive electrode active material precursor with a lithium salt and performing a heat treatment, wherein a feed rate of the metal salt solution for forming a shell added to the metal salt solution for forming a core is different for each of core, intermediate layer, and shell forming regions of the active material particle.

According to another aspect of the present invention, there is provided a positive electrode including the above-described positive electrode active material.

According to another aspect of the present invention, there is provided a lithium secondary battery including the positive electrode.

Advantageous Effects

Since a positive electrode active material for a secondary battery according to the present invention has optimized structure and composition in consideration of an electrochemical operation mechanism according to the position in a positive electrode active material particle for each layer of a core, an intermediate layer, and a shell, the positive electrode active material may have high capacity, long lifetime, and excellent stability when used in a battery, and, particularly, performance degradation may be minimized even at a high voltage. As a result, the positive electrode active material for a secondary battery according to the present invention is suitable for a positive electrode active material of a high-voltage battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

1: Core
2: Intermediate layer
3: Shell
10: Positive electrode active material Mode for Carrying out the Invention Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
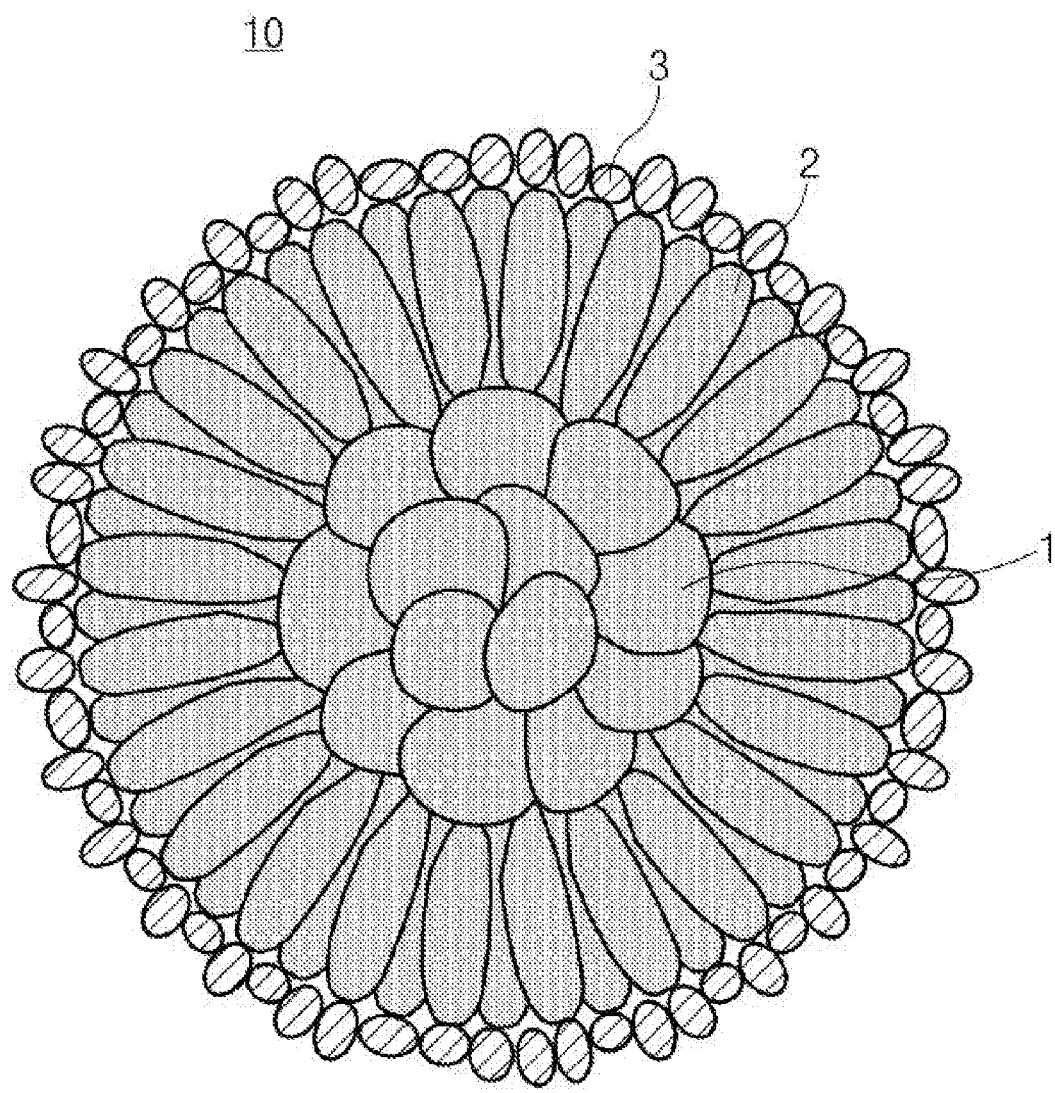
FIG. 1 is a schematic cross-sectional view illustrating a positive electrode active material for a secondary battery according to an embodiment of the preset invention.

FIG. 1 is a schematic cross-sectional view illustrating a positive electrode active material for a secondary battery according to an embodiment of the present invention. FIG. 1 is only an example for describing the present invention and the scope of the present invention is not limited thereto.

Referring to FIG. 1, a positive electrode active material 10 for a secondary battery according to an embodiment of the present invention has a three-layer structure including a core 1, an intermediate layer 2 disposed on the core, and a shell 3 disposed on the intermediate layer, wherein the core 1 is a secondary particle assembled by primary particles of a nickel manganese cobalt-based first lithium composite metal oxide (hereinafter, simply referred to as "NMC-based first lithium oxide"), the intermediate layer includes rod-shaped nickel manganese cobalt-based second lithium composite metal oxide (hereinafter, simply referred to as "NMC-based second lithium oxide"), particles oriented from a center of an active material particle to a surface thereof, and the shell includes a nickel manganese cobalt-based third lithium composite metal oxide (hereinafter, simply referred to as "NMC-based third lithium oxide").

In the present invention, the expression "rod-shaped" denotes a bar shape extending in one axis direction, and, specifically, one with an aspect ratio (ratio of length of major axis passing through particle center to length of minor axis perpendicular to the major axis and passing through the particle center (=the length of the major axis/the length of the minor axis)) of greater than 1 and equal to or less than 20, wherein it is different from a particulate with an aspect ratio of 1 and a fiber with an aspect ratio of greater than 20.

Specifically, the primary particles of the NMC-based first lithium oxide included in the core 1 of the positive electrode active material may have at least one shape of a granular shape and a rod shape. For example, the primary particle may have a rod shape, and, in this case, the core may be a secondary particle in which the rod-shaped primary particles are disorderly assembled without orientation. Since the rod-shaped primary particles are assembled in a randomly aggregated form and included, structural stability of the positive electrode active material may be improved, and, as a result, battery performance may be improved.

The NMC-based first lithium oxide included in the core 1 may specifically be a compound of the following Formula 1:

$$Li_{a1}M1_{x1}M2_{y1}M3_{z1}M4_{w1}O_{2+\delta1} \quad \text{[Formula 1]}$$

(in Formula 1, M1, M2, and M3 each independently include at least one metallic element selected from the group consisting of nickel (Ni), cobalt (Co), and manganese (Mn), M4 includes at least one element selected from the group consisting of iron (Fe), sodium (Na), magnesium (Mg), calcium (Ca), titanium (Ti), vanadium (V), chromium (Cr), copper (Cu), zinc (Zn), germanium (Ge), strontium (Sr), silver (Ag), barium (Ba), zirconium (Zr), niobium (Nb), molybdenum (Mo), aluminum (Al), gallium (Ga), and boron (B), $0<a1\leq1.1$, $0\leq x1\leq1$, $0\leq y1\leq1$, $0\leq z1\leq1$, $0\leq w1\leq0.1$, $0.0\leq\delta1\leq0.02$, and $0<x1+y1+z1\leq1$)

A composition of the first lithium oxide of Formula 1 is an average composition of the entire core.

Among these materials, the first lithium oxide, for example, may be a lithium nickel manganese cobalt-based oxide, such as $LiNi_{0.6}Mn_{0.2}Co_{0.2}O_2$ or $LiNi_{0.9}Mn_{0.05}Co_{0.05}O_2$, in which an amount of the nickel included in the first lithium oxide is 50 at % or more, for example, 70 at % or more, in terms of increasing capacity characteristics and stability of the battery.

Also, a concentration of the at least one metallic element of the nickel, the cobalt, and the manganese included in the core 1 may have a gradient in which the concentration is continuously increased or decreased in the core, that is, from the center of the positive electrode active material particle to an interface between the core and the intermediate layer. That is, the metallic element may have a concentration gradient in the primary particle itself constituting the core, and the metallic element may also have a concentration gradient from the center of the positive electrode active material to a surface of the core 1 in the secondary particle core which is formed by assembly of the primary particles.

The core 1 may have a thickness of 0.5 μm to 3 μm when the thickness of the core is defined as a distance from the center of the positive electrode active material particle to the interface between the core and the intermediate layer. When the core has a thickness within the above range, an effect of improvement in the battery performance is significant due to the structural stabilization of the positive electrode active material.

In the positive electrode active material, the intermediate layer 2 disposed on the surface of the core 1 includes the rod-shaped NMC-based second lithium oxide particles having a radial crystal orientation from the particle center to the surface.

Specifically, the neighboring NMC-based second lithium oxide particles grow along a predetermined path from the surface of the core 1 toward the particle surface to constitute the intermediate layer 2. In this case, a single rod-shaped NMC-based second lithium oxide particle may continuously grow to a thickness of the intermediate layer 2, or another NMC-based second lithium oxide particle may grow along a predetermined path while the another NMC-based second lithium oxide particle is stacked in series with the single rod-shaped NMC-based second lithium oxide particle to form a layer structure. As described above, since the rod-shaped NMC-based second lithium oxide particles are continuously arranged while facing a direction of the particle surface, a contact resistance in the particle is significantly reduced to effectively transfer electrical energy generated in the particle, and, as a result, high capacity may be achieved. Also, since intercalation of lithium ions into a space formed between the predetermined paths is facilitated, output of the battery may be improved and high capacity characteristics may be obtained.

In the intermediate layer 2, the NMC-based second lithium oxide particle may specifically be a rod-shaped particle having an aspect ratio (ratio of length of major axis passing through particle center to length of minor axis passing through the particle center) of greater than 1 and equal to or less than 20. In a case in which the aspect ratio of the particle is 1 or less, there is a concern that the contact resistance between the particles may increase, and, in a case in which the aspect ratio of the particle is greater than 20, since the length of the particle is excessively increased to almost become a fiber, there is a concern that breakage of the positive electrode active material may occur due to the deterioration of mechanical properties of the intermediate layer 2. Also, in a case in which the another NMC-based second lithium oxide particle grows along a predetermined path while the another NMC-based second lithium oxide particle is stacked in series with the single rod-shaped NMC-based second lithium oxide particle to form a layer structure, the aspect ratio of the NMC-based second lithium oxide particle may be increased from the center of the positive electrode active material particle to the surface thereof.

Furthermore, the NMC-based second lithium oxide included in the intermediate layer 2 may specifically be a compound of the following Formula 2.

$$Li_{a2}M1_{x2}M2_{y2}M3_{z2}M4_{w2}O_{2+\delta2} \quad \text{[Formula 2]}$$

(in Formula 2, M1, M2, and M3 each independently include at least one metallic element selected from the group consisting of Ni, Co, and Mn, M4 includes at least one element selected from the group consisting of Fe, Na, Mg, Ca, Ti, V, Cr, Cu, Zn, Ge, Sr, Ag, Ba, Zr, Nb, Mo, Al, Ga, and B, $0<a2\leq1.1$, $0\leq x2\leq1$, $0\leq y2\leq1$, $0\leq z2\leq1$, $0\leq w2\leq0.1$, $0.0\leq\delta2\leq0.02$, and $0<x2+y2+z2\leq1$)

A composition of the second lithium oxide of Formula 2 is an average composition of the entire intermediate layer.

Among these materials, the second lithium oxide, for example, may be a lithium nickel manganese cobalt-based oxide, in which an amount of the nickel included in the second lithium oxide is 50 at % or more, for example, 55 at % or more, in terms of increasing the capacity characteristics and stability of the battery.

Also, a concentration of the at least one metallic element of the nickel, the cobalt, and the manganese included in the intermediate layer 2 may have a gradient in which the concentration is increased or decreased from the interface between the core 1 and the intermediate layer 2 to an interface between the intermediate layer 2 and the shell 3. In this case, the concentration of the metallic element may be continuously increased or decreased from the center of the positive electrode active material particle to the interface between the intermediate layer 2 and the shell 3, or a concentration difference of the corresponding metallic element, that is, a discontinuous section, may occur at the interface between the core 1 and the intermediate layer 2, or an inflection point may occur.

The intermediate layer 2 may have a thickness of 2 μm to 10 μm when the thickness of the intermediate layer is defined as a distance from the interface between the core 1 and the intermediate layer 2 to the interface between the intermediate layer 2 and the shell 3. When the intermediate layer has a thickness within the above range, the contact resistance in the particle may be reduced due to a unique structure of the intermediate layer 2, and, accordingly, an effect of improvement in capacity and output characteristics of the battery is significant.

Furthermore, in the positive electrode active material, the shell 3 is formed on the surface of the intermediate layer 2.

The shell 3 may be a thin film of the NMC-based third lithium oxide, or may be one in which particles of the NMC-based third lithium oxide are dispersed in the form of dots on the intermediate layer.

$$Li_{a3}M1_{x3}M2_{y3}M3_{z3}M4_{w3}O_{2+\delta3}$$ [Formula 3]

(in Formula 3, M1, M2, and M3 each independently include at least one metallic element selected from the group consisting of Ni, Co, and Mn, M4 includes at least one element selected from the group consisting of Fe, Na, Mg, Ca, Ti, V, Cr, Cu, Zn, Ge, Sr, Ag, Ba, Zr, Nb, Mo, Al, Ga, and B, $0<a3\leq1.1$, $0\leq x3\leq1$, $0\leq y3\leq1$, $0\leq z3\leq1$, $0\leq w3\leq0.1$, $0.0\leq\delta3\leq0.02$, and $0<x3+y3+z3\leq1$)

A composition of the third lithium oxide of Formula 3 is an average composition of the entire shell.

Among these materials, the third lithium oxide, for example, may be a lithium nickel manganese cobalt-based oxide, in which an amount of the nickel included in the third lithium oxide is 50 at % or more, for example, 55 at % or more, in terms of increasing the capacity characteristics and stability of the battery.

Also, the at least one metallic element of the nickel, the cobalt, and the manganese included in the shell 3 may have a concentration gradient in which the concentration is increased or decreased from the interface between the intermediate layer 2 and the shell 3 to the surface of the positive electrode active material particle. In this case, the concentration of the metallic element may be continuously increased or decreased over the entire positive electrode active material, or the concentration of the corresponding metallic element may be discontinuously changed at the interface between the intermediate layer 2 and the shell 3, or an inflection point may occur.

Furthermore, the concentrations of the nickel, cobalt, and manganese included in the shell 3 may be constant. In a case in which the concentrations of the all metallic elements in the shell 3 are constant, stability of the structure itself and electrochemical properties may be improved.

The shell 3 may have a thickness of 0.1 μm to 1 μm when the thickness of the shell is defined as a distance from the interface between the intermediate layer 2 and the shell 3 to the surface of the positive electrode active material. When the shell has a thickness within the above range, the effect of improvement in the battery performance is significant due to the structural stabilization of the positive electrode active material.

Also, in the positive electrode active material according to the embodiment of the present invention, when the distance from the center of the positive electrode active material particle to the interface between the core and the intermediate layer is defined as the thickness of the core, the distance from the interface between the core and the intermediate layer to the interface between the intermediate layer and the shell is defined as the thickness of the intermediate layer, and the distance from the interface between the intermediate layer and the shell to the surface of the positive electrode active material is defined as the thickness of the shell, the core, the intermediate layer, the shell may satisfy the thickness ranges as defined above, the core may have a thickness of 3% to 30% of an average particle diameter of the positive electrode active material at the same time, and a ratio of the thickness of the intermediate layer to the thickness of the shell may be in a range of 1:0.01 to 1:0.5. When the optimum thickness condition of each layer is satisfied, effects due to the unique shape and orientation of the lithium composite metal oxide particles in each region of the core, the intermediate layer, and the shell may be maximized, and, as a result, life characteristics and thermal stability may be significantly improved when used in the battery.

Particularly, in a case in which the ratio of the thickness of the intermediate layer to the thickness of the shell is less than 1:0.01, that is, outside the above range of the thickness ratio of the intermediate layer to the shell, an improvement effect due to the formation of the shell is insignificant, and, in a case in which the ratio of the thickness of the intermediate layer to the thickness of the shell is greater than 1:0.01, the intermediate layer may be broken during rolling in an electrode preparation process. Also, in a case in which the ratio of the thickness of the intermediate layer to the thickness of the shell is greater than 1:1, a movement distance of lithium ions is increased, and, accordingly, resistance may be increased.

As described above, the positive electrode active material having the above-described structure according to the present invention may have a concentration gradient in which the concentration of the at least one metallic element of the nickel, the cobalt, and the manganese in each of core, intermediate layer, and shell forming regions is increased or decreased, or may have a concentration gradient in which the concentration of the at least one metallic element of the nickel, the cobalt, and the manganese is continuously increased or decreased from the core 1, the intermediate layer 2, the shell 3, or the center of the positive electrode active material particle 10 to the interface between the intermediate layer 2 and the shell 3, or from the center of the positive electrode active material particle 10 to the surface thereof. Furthermore, the number of concentration gradient slopes of the metal having the concentration gradient in each of the above-described regions may be two or more.

In the present invention, the expression "the concentration of the metallic element continuously has a gradient" denotes that the metallic element has a concentration distribution in which the concentration of the metallic element is gradually changed from the core 1, the intermediate layer 2, the shell 3, or the center of the positive electrode active material particle 10 to the interface between the intermediate layer 2 and the shell 3, or from the center of the positive electrode active material particle 10 to the surface thereof. Specifically, in the concentration distribution, the metal concentration per 0.1 μm from the core 1, the intermediate layer 2, the shell 3, or the center of the positive electrode active material particle 10 to the interface between the intermediate layer 2 and the shell 3, or from the center of the positive electrode active material particle 10 to the surface thereof has a difference of 0.1 at % to 30 at %, particularly 0.1 at % to 20 at %, and more particularly 1 at % to 10 at % based on a total atomic weight of the corresponding metal included in the positive electrode active material.

As described above, in a case in which the metal has a concentration gradient in which the concentration of the metal is continuously changed according to the position in the positive electrode active material particle, since an abrupt phase boundary region is not present, its crystal structure is stabilized and thermal stability is increased. In this case, when the concentration gradient slope of the metallic element is constant from the center of the positive electrode active material particle to the surface thereof, the effect of improvement in the structural stability may be further improved.

Also, since the concentrations at the center and surface of the positive electrode active material particle are changed by the concentration gradient, the effect of the positive electrode active material on the improvement of the battery performance may be further improved by easily using properties of the corresponding metal.

Specifically, in the positive electrode active material according to the embodiment of the present invention, the concentration of the nickel included in the positive electrode active material may be decreased while the nickel has a continuous concentration gradient from the center of the positive electrode active material particle to the interface between the intermediate layer and the shell. In this case, a concentration gradient slope of the nickel may be constant from the center of the positive electrode active material particle to the interface between the intermediate layer and the shell. In a case in which the nickel has a high concentration in the core and the concentration is decreased from the core to the shell, a decrease in capacity may be prevented while thermal stability is obtained.

Furthermore, in the positive electrode active material 10 according to the embodiment of the present invention, the concentration of the cobalt included in the positive electrode active material may be increased while the cobalt has a continuous concentration gradient from the center of the positive electrode active material particle 10 to the interface between the intermediate layer 2 and the shell 3. In this case, a concentration gradient slope of the cobalt may be constant from the center of the positive electrode active material particle 10 to the interface between the intermediate layer 2 and the shell 3. In a case in which the cobalt has a low concentration in the core 1 and the concentration is increased from the core to the shell 3, a decrease in capacity may be prevented while reducing the amount of the cobalt used.

Also, in the positive electrode active material 10 according to the embodiment of the present invention, the concentration of the manganese included in the positive electrode active material may be increased while the manganese has a continuous concentration gradient from the center of the positive electrode active material particle 10 to the interface between the intermediate layer 2 and the shell 3. In this case, a concentration gradient slope of the manganese may be constant from the center of the positive electrode active material particle 10 to the surface thereof. In a case in which the manganese has a low concentration in the core 1 and the concentration is increased from the core to the shell 3, excellent thermal stability may be obtained without a decrease in capacity.

Furthermore, in the positive electrode active material 10 according to the embodiment of the present invention, the concentration of the nickel included in the positive electrode active material may be decreased while the nickel has a continuous concentration gradient from the center of the positive electrode active material particle 10 to the interface between the intermediate layer 2 and the shell 3, and, the concentrations of the cobalt and manganese may each independently be increased while the cobalt and manganese each independently have a continuous concentration gradient from the center of the positive electrode active material particle 10 to the interface between the intermediate layer 2 and the shell 3. As described above, since the concentration of the nickel is gradually decreased and the concentrations of the cobalt and the manganese are gradually increased from the center of the positive electrode active material particle 10 to the surface thereof, the positive electrode active material 10 according to the embodiment of the present invention may exhibit thermal stability while maintaining capacity characteristics.

Also, in the positive electrode active material 10 according to the embodiment of the present invention, the concentration of the nickel included in the positive electrode active material may be decreased while the nickel has a continuous concentration gradient from the center of the positive electrode active material particle 10 to the interface between the intermediate layer 2 and the shell 3, and, the concentration of any one metal of the cobalt and the manganese included in the positive electrode active material may be constant from the center of the positive electrode active material particle 10 to the interface between the intermediate layer 2 and the shell 3.

Furthermore, the concentration of the nickel included in the positive electrode active material may be decreased while the nickel has a continuous concentration gradient from the center of the positive electrode active material particle 10 to the surface thereof, and, the concentrations of the cobalt and the manganese may each independently be increased while the cobalt and the manganese each independently have a continuous concentration gradient from the center of the positive electrode active material particle 10 to the surface thereof.

Also, the concentration of the nickel included in the positive electrode active material may be decreased while the nickel has a continuous concentration gradient from the center of the positive electrode active material particle 10 to the surface thereof, and, the concentration of any one metal of the cobalt and the manganese included in the positive electrode active material may be constant from the center of the positive electrode active material particle 10 to the surface thereof.

In addition, in the positive electrode active material 10 according to the embodiment of the present invention, in a case in which the concentration of the nickel included in the positive electrode active material is decreased while the nickel has a continuous concentration gradient from the center of the positive electrode active material particle 10 to the interface between the intermediate layer 2 and the shell 3 or to the surface of the positive electrode active material particle, a difference between average concentrations of the nickel in the core 1 and the shell 3 may be in a range of 10 at % to 70 at %, particularly 10 at % to 45 at %, and more particularly 20 at % to 40 at % based on a total atomic weight of the nickel included in the positive electrode active material.

In the preset invention, the concentration gradient structure and concentration of the metal in the positive electrode active material particle may be identified by using a method such as electron probe microanalysis (SPMA), inductively coupled plasma-atomic emission spectroscopy (ICP-AES), or time of flight secondary ion mass spectrometry (ToF-SIMS), and, specifically, an atomic ratio of each metal may be measured by EPMA while moving from the center of the positive electrode active material to the surface thereof.

Furthermore, the positive electrode active material according to the embodiment of the present invention may further include pores disposed between the primary particles constituting the core, between the rod-shaped particles constituting the intermediate layer, or between primary particles constituting the positive electrode active material, for example, between the primary particles constituting the core and between the rod-shaped particles constituting the intermediate layer. These pores have a buffer action during the rolling for the preparation of the electrode and, since these pores allow an electrolyte solution to easily penetrate into the active material to be able to react with the core, these pores play a role in increasing a reaction area of the active material with respect to the electrolyte solution. Specifically, the positive electrode active material including the pores may have a porosity of 20 vol % to 30 vol % based on a total volume of the positive electrode active material. When the positive electrode active material has porosity within the above range, the positive electrode active material may have an excellent buffer action without a decrease in mechanical strength of the active material itself and an effect of increasing the reaction area with respect to the electrolyte solution. In particular, when the porosity in the positive electrode active material is greater than 30 vol %, there is a concern that the structural stability of the positive electrode active material may be reduced. The positive electrode active material, for example, may have a porosity of 20 vol % to 25 vol % in consideration of the significant improvement effect due to the formation of pores. The porosity of the positive electrode active material may be calculated from a difference between apparent density and true density.

The positive electrode active material 10 having the above-described structure may have an average particle diameter ($D_{50}$) of 3 μm to 50 μm in consideration of specific surface area and positive electrode material mixture density, and may have an average particle diameter ($D_{50}$) of 5 μm to 30 μm in consideration of an effect of improvement in rate capability and initial capacity characteristics due to its unique structure. In the present invention, the average particle diameter ($D_{50}$) of the positive electrode active material may be defined as a particle diameter at 50% in a cumulative particle diameter distribution. For example, the average particle diameter ($D_{50}$) of the positive electrode active material according to the embodiment of the present invention may be measured by using a laser diffraction method. For example, in the method of measuring the average particle diameter ($D_{50}$) of the positive electrode active material, particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about kHz and an output of 60 W, and the average particle diameter ($D_{50}$) at 50% in a cumulative particle diameter distribution of the measurement instrument may then be calculated.

The positive electrode active material 10 having the above structure according to the embodiment of the present invention may be prepared by a method including the steps of: preparing a metal salt solution for forming a core which includes nickel, cobalt, and manganese, and a metal salt solution for forming a shell which includes nickel, cobalt, and manganese in a concentration different from that of the metal salt solution for forming a core (step 1); preparing a positive electrode active material precursor by adding a chelating agent and a basic aqueous solution as well as the metal salt solution for forming a shell to the metal salt solution for forming a core to allow a mixing ratio of the metal salt solution for forming a core to the metal salt solution for forming a shell to be gradually changed from 100 vol %:0 vol % to 0 vol %:100 vol %, wherein a feed rate of the metal salt solution for forming a shell added to the metal salt solution for forming a core is different for each of core, intermediate layer, and shell forming regions (step 2); and mixing the positive electrode active material precursor with a lithium salt and performing a heat treatment (step 3). Hereinafter, each step will be described in detail.

In the method of preparing the positive electrode active material, step 1 is a step of preparing a metal salt solution for forming a core and a metal salt solution for forming a shell which include nickel, cobalt, and manganese.

The metal salt solution for forming a shell may be prepared in the same manner as the metal salt solution for forming a core except that the metal salt solution for forming a shell includes nickel, cobalt, and manganese in a concentration different from that of the metal salt solution for forming a core. Specifically, each of the metal salt solution for forming a core and the metal salt solution for forming a shell may be prepared by adding a nickel salt, a cobalt salt, a manganese salt, and a salt including other metals (M4) to a solvent, particularly water, or solutions, particularly aqueous solutions, including each of the nickel salt, the cobalt salt, the manganese salt, and the M4 salt are prepared and these solutions may then be mixed and used.

A sulfate, a nitrate, an acetic acid salt, a halide, a hydroxide, or an oxyhydroxide may be used as the metal salt, and the metal salt is not particularly limited as long as it may be dissolved in water. For example, the cobalt salt may include $Co(OH)_2$, CoOOH, $Co(OCOCH_3)_2 \cdot 4H_2O$, $Co(NO_3)_2 \cdot 6H_2O$, or $Co(SO_4)_2 \cdot 7H_2O$, and any one thereof or a mixture of two or more thereof may be used.

Next, in the method of preparing the positive electrode active material, step 2 is a step of preparing a positive electrode active material precursor by mixing and reacting the metal salt solution for forming a core and the metal salt solution for forming a shell which are prepared in step 1.

Specifically, the positive electrode active material precursor may be prepared by mixing a chelating agent and a basic aqueous solution as well as the metal salt solution for forming a shell with the metal salt solution for forming a core and performing a reaction.

The addition of the metal salt solution for forming a shell to the metal salt solution for forming a core is continuously performed. Since the metal salt solution for forming a shell is continuously provided to perform the reaction, a precipitate having a concentration gradient, in which the concentration of the metal is continuous from the center of the particle to the surface thereof, may be obtained by a single co-precipitation reaction process. The concentration gradient of the metal in the active material precursor formed in this case and its slope may be easily adjusted by compositions and a mixed feed ratio of the metal salt solution for forming a core and the metal salt solution for forming a shell.

Also, the three-layer structure of the core, the intermediate layer, and the shell each having the characteristic structure as described above may be formed by controlling a reaction rate of the metal salt solution for forming a core and the metal salt solution for forming a shell. Specifically, density of the formed metal composite oxide may vary depending on a position in the prepared precursor particle by controlling the reaction rate of the metal salt solution for forming a core and the metal salt solution for forming a shell, and such a density difference allows unique shape and orientation during a subsequent heat treatment process.

The reaction rate may be adjusted by controlling the feed rate of the metal salt solution for forming a shell with respect to the metal salt solution for forming a core, and, additionally, pH and reaction temperature may be further controlled. Specifically, the feed rate of the metal salt solution for forming a shell may be in a range of 10 g/min to 20 g/min, and the feed rate of the metal salt solution for forming a shell added to the metal salt solution for forming a core may be increased or decreased within the above range of the feed rate for each of the core, intermediate layer, and shell forming regions. The feed rate of the metal salt solution for forming a shell may be gradually increased within the above range from the core forming region to the shell forming region. For example, the feed rate is in a range of 10 g/min to 15 g/min in the core forming region, the feed rate is in a range of 12 g/min to 18 g/min in the intermediate layer forming region but the metal salt solution for forming a shell may be added at a rate greater than that in the core forming region, and the feed rate is in a range of 15 g/min to 20 g/min in the shell forming region but the metal salt solution for forming a shell may be added at a rate greater than that in the intermediate layer forming region. In this case, the reaction temperature may be in a range of 50° C. to 80° C.

Furthermore, the pH in the reaction system may be in a range of 10 to 12. In a case in which the pH is outside the above range, there is a concern that size of the positive electrode active material precursor prepared may be changed or particle breakage may occur. Also, since metal ions are eluted on the surface of the positive electrode active material precursor, there is a concern that various oxides may be formed by a side reaction. The adjustment of the pH as described above may be controlled by the addition of the basic aqueous solution, and, in consideration of formability of the unique structure of the positive electrode active material according to the present invention, the reaction may be performed by gradually decreasing the pH within the above-described range.

Furthermore, in step 2, an aqueous ammonia solution, an aqueous ammonium sulfate solution, or a mixture thereof may be used as the chelating agent.

The chelating agent may be added in an amount such that a molar ratio of the chelating agent to 1 mole of the mixed solution of the metal salt solution for forming a core and the metal salt solution for forming a shell becomes 0.5 to 1. In general, the chelating agent reacts with metal at a molar ratio equal to or greater than 1:1 to form a complex, but, since an unreacted complex, which does not react with the basic aqueous solution, among the formed complex may be changed into an intermediate product to be recovered and reused as the chelating agent, the amount of the chelating agent used may be reduced in the present invention, in comparison to a conventional case. As a result, crystallinity of the positive electrode active material may be increased and stabilized.

Also, the basic aqueous solution may be prepared by dissolving a base, such as sodium hydroxide and potassium hydroxide, in water.

A concentration of the basic aqueous solution may be in a range of 2 M to 10 M. In a case in which the concentration of the basic aqueous solution is less than 2 M, particle formation time may be increased, tap density may be reduced, and yield of a co-precipitation reaction product may be reduced. Also, in a case in which the concentration of the basic aqueous solution is greater than 10 M, since the particles are rapidly grown due to the rapid reaction, it is difficult to form uniform particles and the tap density may also be reduced.

Furthermore, during the preparation of the positive electrode active material precursor, the feed rate of the metal salt solution for forming a shell added to the metal salt solution for forming a core and a feed rate of the basic aqueous solution may be the same, and a feed rate of the chelating agent may be 5 times to 7 times lower than the feed rate of the metal salt solution for forming a shell. For example, the feed rate of the chelating agent in the core forming region may be in a range of 1 g/min to 5 g/min, and the feed rate of the basic aqueous solution may be may be in a range of 10 g/min to 20 g/min.

Also, the reaction for the preparation of the positive electrode active material precursor may be performed in a temperature range of 30° C. to 80° C. in an inert atmosphere such as nitrogen. Furthermore, a stirring process may be selectively performed to increase the reaction rate during the reaction, and, in this case, a stirring speed may be in a range of 100 rpm to 2,000 rpm.

As a result of the above-described reaction in step 2, a positive electrode active material precursor having the three-layer structure of the core, the intermediate layer, and the shell is precipitated. The precipitated positive electrode active material precursor may be separated by a typical method, a drying process may then be selectively performed, and, in this case, the drying process may be performed in a temperature range of 110° C. to 400° C. for 15 hours to 30 hours.

Next, in the method of preparing the positive electrode active material, step 3 is a step of preparing a positive electrode active material by mixing the positive electrode active material precursor prepared in step 2 with a lithium salt and performing a heat treatment.

A lithium-containing sulfate, nitrate, acetic acid salt, carbonate, oxalate, citrate, halide, hydroxide, or oxyhydroxide may be used as the lithium salt, and the lithium salt is not particularly limited as long as it may be dissolved in water. Specifically, the lithium salt may include $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

Also, a sintering agent may be further selectively added during the mixing of the positive electrode active material precursor with the lithium salt. The sintering agent may specifically be an ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and any one thereof or a mixture of two or more thereof may be used. The sintering agent may be used in an amount of 0.01 mol to 0.2 mol based on 1 mol of the positive electrode active material precursor. If the amount of the sintering agent is excessively low at less than 0.01 mol, an effect of improvement in sintering characteristics of the positive electrode active material precursor may be insignificant, and, if the amount of the sintering agent is excessively high at greater than 0.2 mol, there is a concern that performance of the positive electrode active material may be reduced and initial capacity of the battery may be reduced during charging and discharging due to the excessive amount of the sintering agent.

Furthermore, a water-removing agent may be further selectively added during the mixing of the positive electrode active material precursor with the lithium salt. Specifically, the water-removing agent may include citric acid, tartaric acid, glycolic acid, or maleic acid, and any one thereof or a mixture of two or more thereof may be used. The water-removing agent may be used in an amount of 0.01 mol to 0.2 mol based on 1 mol of the positive electrode active material precursor.

Also, the heat treatment process in step 3 may be performed in a temperature range of 800° C. to 1100° C. If the temperature during the heat treatment is less than 800° C., discharge capacity per unit weight may be reduced, cycle characteristics may be reduced, and an operating voltage may be reduced due to residual unreacted raw materials, and, if the temperature during the heat treatment is greater than 1100° C., the discharge capacity per unit weight may be reduced, the cycle characteristics may be reduced, and the operating voltage may be reduced due to the formation of a side reaction product.

Furthermore, the heat treatment process may be performed for 5 hours to 30 hours in an oxidizing atmosphere such as air or oxygen, or a reducing atmosphere including nitrogen or hydrogen. A diffusion reaction between the particles may be sufficiently performed through the heat treatment process under the above-described condition, and, since diffusion of the metal also occurs in a portion in which an internal metal concentration is constant, a metal oxide having a continuous metal concentration distribution from the center to the surface may be prepared.

Preliminary sintering, in which the temperature is maintained at 250° C. to 650° C. for 5 hours to 20 hours, may be further selectively performed before the heat treatment process. Also, after the heat treatment process, an annealing process may be selectively performed in a temperature range of 600° C. to 750° C. for 10 hours to 20 hours.

As described above, the positive electrode active material prepared by the above-described preparation method has optimized structure and composition in consideration of an electrochemical operating mechanism according to the position in the positive electrode active material particle for each layer of the core, the intermediate layer, and the shell. Accordingly, when the positive electrode active material is used in a battery, high capacity, long lifetime, and excellent stability may be obtained, and, particularly, performance degradation may be minimized even at a high voltage.

According to another embodiment of the present invention, a positive electrode including the above-described positive electrode active material is provided.

Specifically, the positive electrode includes a positive electrode collector and a positive electrode active material layer formed on the positive electrode collector and including the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer including the above-described positive electrode active material and selectively, the binder and the conductive agent is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

PREPARATION EXAMPLE 1

Preparation of Positive Electrode Active Material

Nickel sulfate, cobalt sulfate, and manganese sulfate were mixed in water at a molar ratio of 90:5:5 to prepare a metal salt solution for forming a core with a concentration of 2M, and nickel sulfate, cobalt sulfate, and manganese sulfate were mixed in water at a molar ratio of 50:20:30 to prepare a metal salt solution for forming a shell with a concentration of 2M.

3 L of deionized water was put in a co-precipitation reactor (capacity 30 L), the reactor was then purged with nitrogen gas at a rate of 0.5 L/min to remove dissolved oxygen in the water and create a non-oxidizing environment in the reactor. Also, stirring was performed at a speed of 1,000 rpm while a temperature of the reactor was maintained at 50° C. After the metal salt solution for forming a core was put into the reactor, the metal salt solution for forming a shell was mixed therewith while the metal salt solution for forming a shell was added at a rate of 14 g/min. At the same time, an ammonia solution with a concentration of 10 M, as a chelating agent, was continuously added to the reactor at a rate of 2 g/min, and a NaOH aqueous solution with a concentration of 4 M was continuously added to the reactor at a rate of 14 g/min to maintain a pH at 11. A co-precipitation reaction was performed while stirring at an impeller speed of the reactor of 500 rpm. After 10 minutes from the start of the co-precipitation reaction, a feed rate of the provided metal salt solution for forming a shell was changed to 16 g/min at a time when a particle diameter of precipitates became 2 μm, and, in a shell forming region, the metal salt solution for forming a shell was added while again changing the feed rate of the metal salt solution for forming a shell to 17 g/min. The co-precipitation reaction was performed over a total of 16 hours to obtain precipitates. The obtained precipitates were sequentially washed with sodium hydroxide and deionized water, filtered, and dried in a hot-air dryer at 130° C. for 12 hours to obtain a positive electrode active material precursor having an average particle diameter ($D_{50}$) of 11 μm.

The positive electrode active material precursor thus prepared was mixed with LiOH as a lithium salt, preliminary sintering was performed by heating at a heating rate of 2° C./min and then maintaining the temperature at 280° C. for 10 hours, and, subsequently, a heat treatment was performed at 850° C. for 15 hours to obtain active material particles.

PREPARATION EXAMPLES 2 AND 3

Preparation of Positive Electrode Active Materials

Positive electrode active materials were prepared in the same manner as in Preparation Example 1 except that a metal salt solution for forming a core and a metal salt solution for forming a shell were respectively prepared and used by mixing nickel sulfate, cobalt sulfate, and manganese sulfate at molar ratios listed in Table 1 below.

TABLE 1

| | Aqueous metal salt solution for forming a core (molar ratio) | | | Aqueous metal salt solution for forming a shell (molar ratio) | | |
|---|---|---|---|---|---|---|
| | Nickel sulfate | Cobalt sulfate | Manganese sulfate | Nickel sulfate | Cobalt sulfate | Manganese sulfate |
| Preparation Example 1 | 90 | 5 | 5 | 50 | 20 | 30 |
| Preparation Example 2 | 85 | 0 | 20 | 55 | 15 | 30 |
| Preparation Example 3 | 80 | 5 | 20 | 55 | 15 | 30 |

EXAMPLES 1 TO 3

Manufacture of Lithium Secondary Batteries

Lithium secondary batteries were respectively manufactured by using the positive electrode active materials prepared in Preparation Examples 1 to 3.

Specifically, the positive electrode active materials respectively prepared in Preparation Examples 1 to 3, a carbon black conductive agent, and a PVdF binder were mixed in an N-methylpyrrolidone solvent at a weight ratio of 90:5:5 to prepare a composition for forming a positive electrode (viscosity: 5,000 mPa·s), and an aluminum current collector was coated with the composition, dried, and rolled to prepared a positive electrode.

Also, as a negative electrode active material, mesocarbon microbead (MCMB), i.e., artificial graphite, a carbon black conductive agent, and a PVdF binder were mixed in an N-methylpyrrolidone solvent at a weight ratio of 85:10:5 to prepare a composition for forming a negative electrode, and a copper current collector was coated with the composition to prepared a negative electrode.

Each lithium secondary battery was manufactured by preparing an electrode assembly by disposing a porous polyethylene separator between the positive electrode and the negative electrode prepared as above, disposing the electrode assembly in a case, and then injecting an electrolyte solution into the case. In this case, the electrolyte solution was prepared by dissolving 1.15 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

COMPARATIVE EXAMPLE 1

Manufacture of Lithium Secondary Battery

A lithium secondary battery was manufactured in the same manner as in Example 1 except that particles including a lithium composite metal oxide of Li(Ni$_{0.60}$Co$_{0.15}$Mn$_{0.25}$)O$_2$ were used as a positive electrode active material.

EXPERIMENTAL EXAMPLE 1

Active Material Analysis

Cross sections of the positive electrode active materials prepared in Example 1 and Comparative Example 1 were respectively observed by using a scanning electron microscope and a transmission electron microscope. The results thereof are presented in FIGS. 2 to 5 below.

Figure 2:
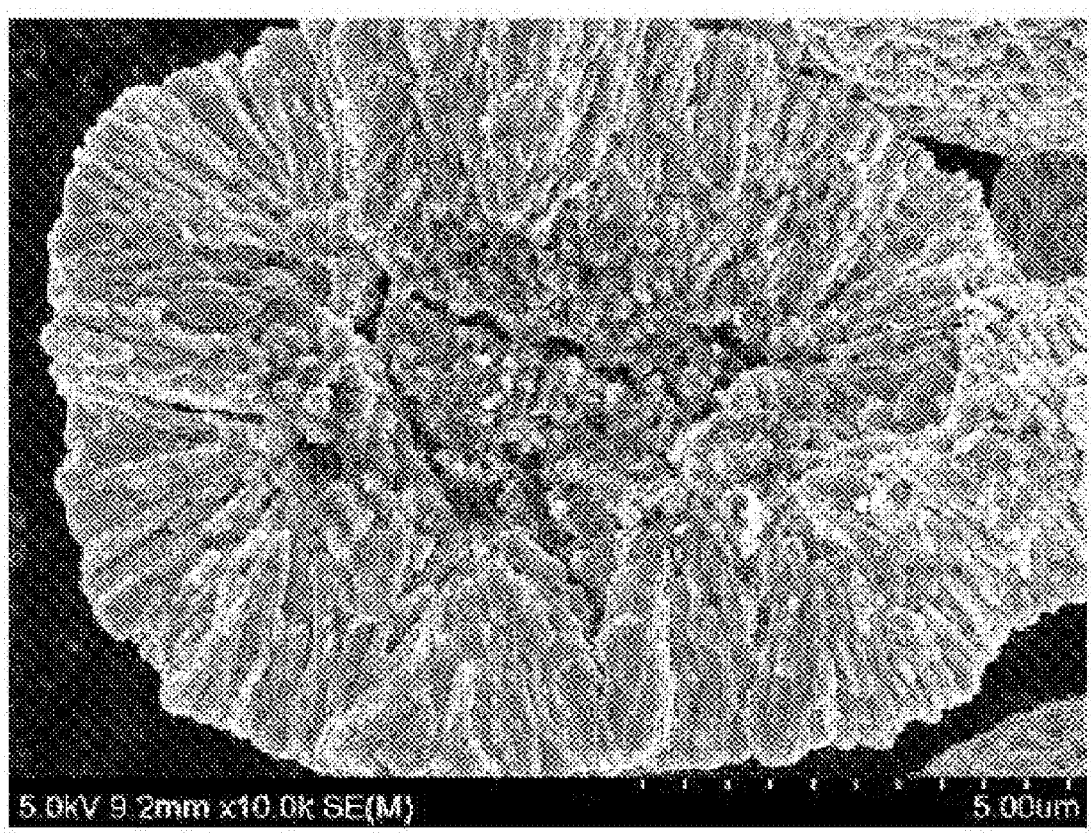
FIG. 2 is a scanning electron microscope (SEM) image of a cross section of a positive electrode active material prepared in Example 1.
Figure 3:
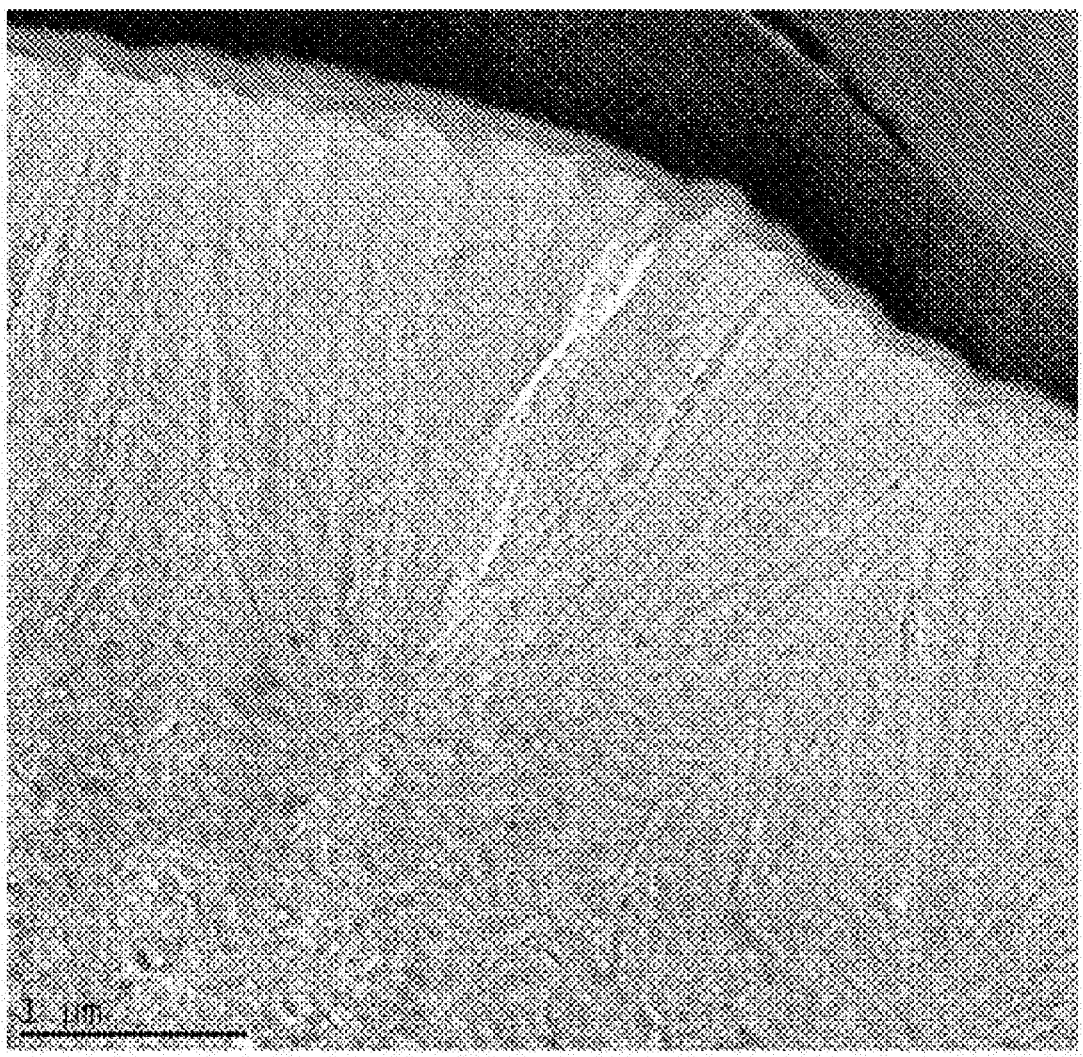
FIG. 3 is a transmission electron microscope (TEM) image of the cross section of the positive electrode active material prepared in Example 1.
Figure 4:
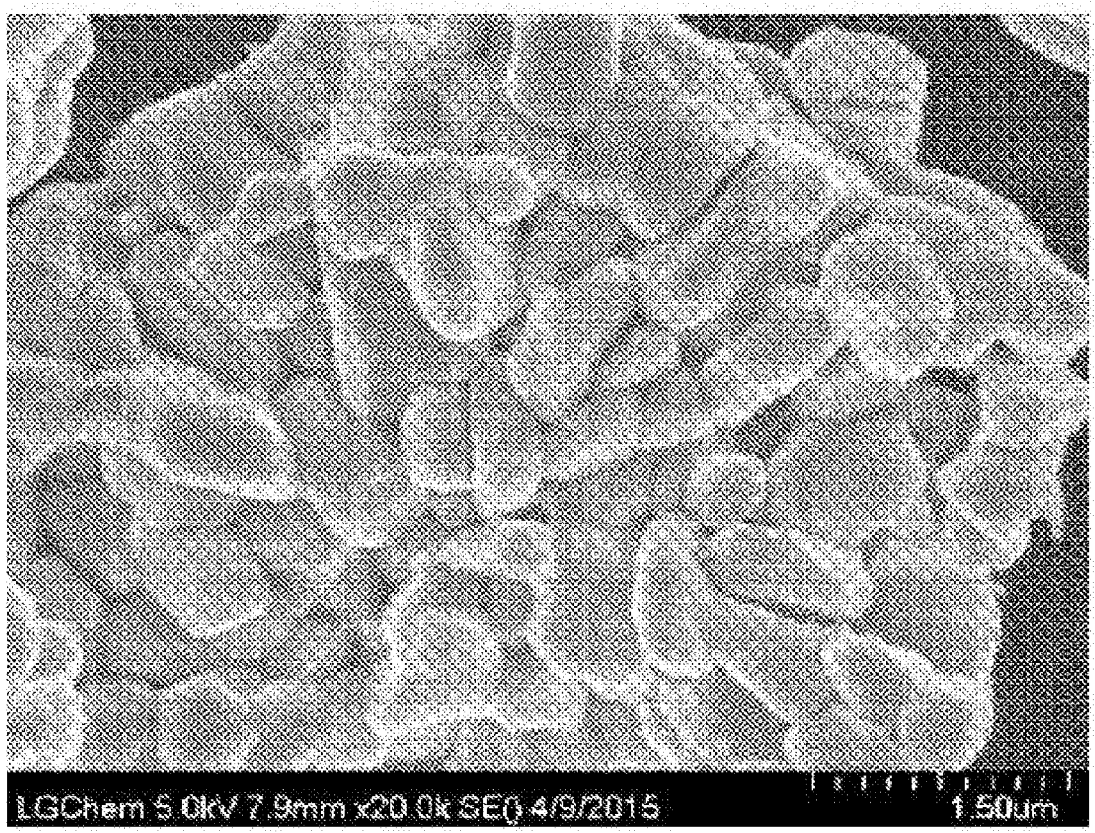
FIG. 4 is an SEM image of a cross section of a positive electrode active material prepared in Comparative Example 1.
Figure 5:
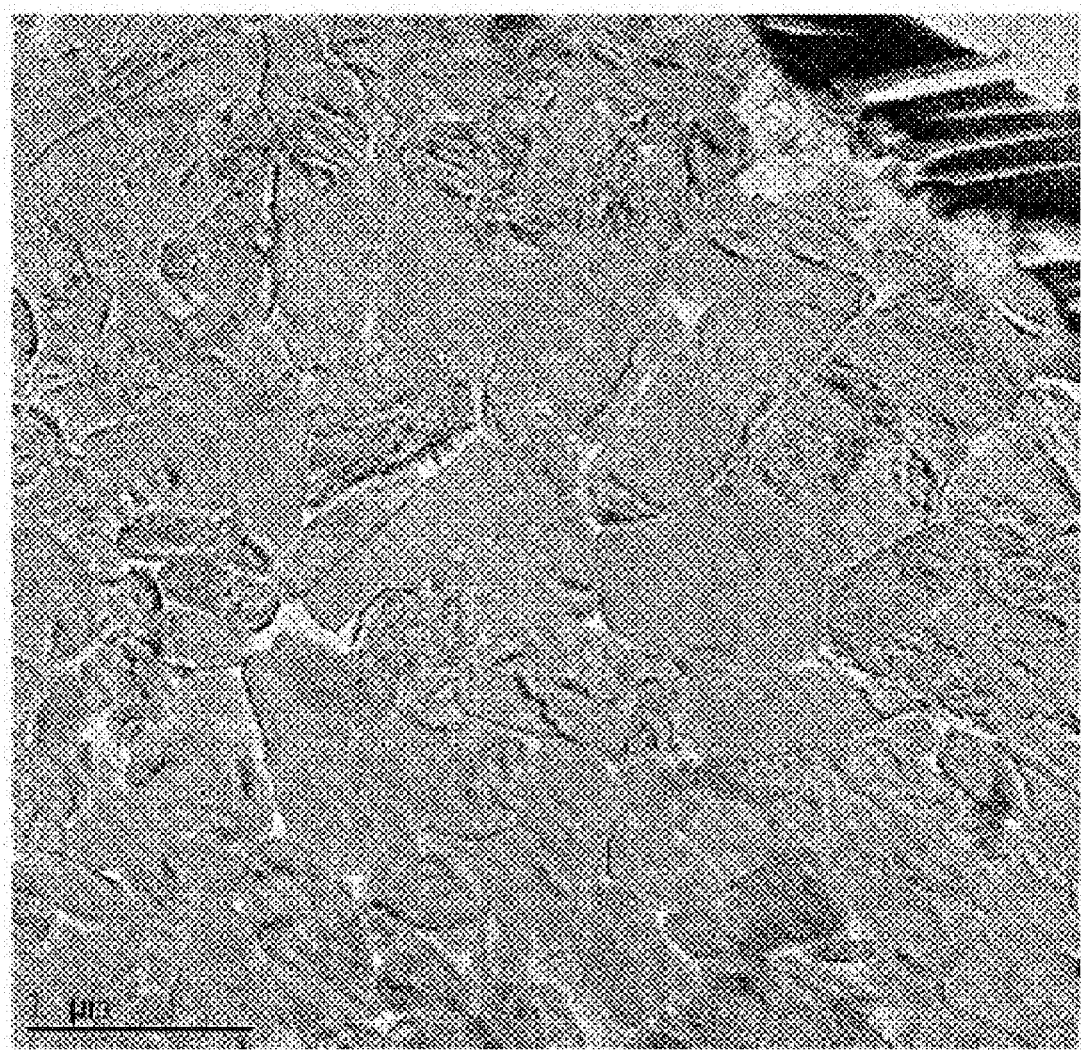
FIG. 5 is a TEM image of the cross section of the positive electrode active material prepared in Comparative Example 1.

FIGS. 2 and 3 are respectively a scanning electron microscope (SEM) image and a transmission electron microscope (TEM) image of the cross section of the positive electrode active material prepared in Example 1, and FIGS. 4 and 5 are respectively an SEM image and a TEM image of the cross section of the positive electrode active material prepared in Comparative Example 1.

From the observation results, an average particle diameter (D$_{50}$) of the positive electrode active material particles prepared in Example 1 was about 11.5 μm, and a three-layer structure was confirmed in which a secondary particle core (thickness of about 2.5 μm), in which rod-shaped primary particles were randomly assembled, was disposed at the center of the particle, an intermediate layer (thickness of about 3.15 μm) including rod-shaped particles (aspect ratio=13) oriented from the center of the active material particle in a surface direction was disposed on the surface of the core, and a shell (thickness of about 0.1 μm) of NMC lithium composite metal oxide particles was disposed on the intermediate layer.

In contrast, with respect to Comparative Example 1, it may be confirmed that primary particles constituting the positive electrode active material without any distinction of core/intermediate layer/shell were agglomerated without orientation to form a secondary particle.

Also, true density and apparent density were respectively measured from the positive electrode active material prepared in Example 1, a porosity was then calculated from the measured values, and, as a result, the porosity of the positive electrode active material was 20 vol %.

Furthermore, a composition of the lithium composite metal oxide in each layer was identified by electron probe X-ray microanalysis (EPMA) of the positive electrode active material particles prepared in Example 1.

Specifically, 10 positions from the core to the surface of the positive electrode active material particle prepared in Example 1 were selected, concentrations of lithium, nickel, manganese, and cobalt at each position were measured, and an average composition of the lithium composite metal oxide in each of the core, the intermediate layer, and the shell was identified from the measurement results.

From the analysis results, the average composition of first lithium composite metal oxide in a core forming region (from the center of the core to an interface between the core and the intermediate layer) was Li[Ni$_{0.82}$Co$_{0.07}$Mn$_{0.13}$]O$_2$, the average composition of second lithium composite metal oxide in an intermediate layer forming region (from the interface between the core and the intermediate layer to an interface between the intermediate layer and the shell) was Li[Ni$_{0.67}$Co$_{0.11}$Mn$_{0.23}$]O$_2$, and the average composition of third lithium composite metal oxide at the interface between the intermediate layer and the shell and on the surface of the shell was Li[Ni$_{0.56}$Co$_{0.17}$Mn$_{0.27}$]O$_2$. From such results, it may be confirmed that concentration gradients were obtained in which Ni was continuously decreased and Co and Mn were continuously increased from the center of the active material particle to the interface between the intermediate layer and the shell.

EXPERIMENTAL EXAMPLE 2

Life Characteristics Evaluation

Figure 6:
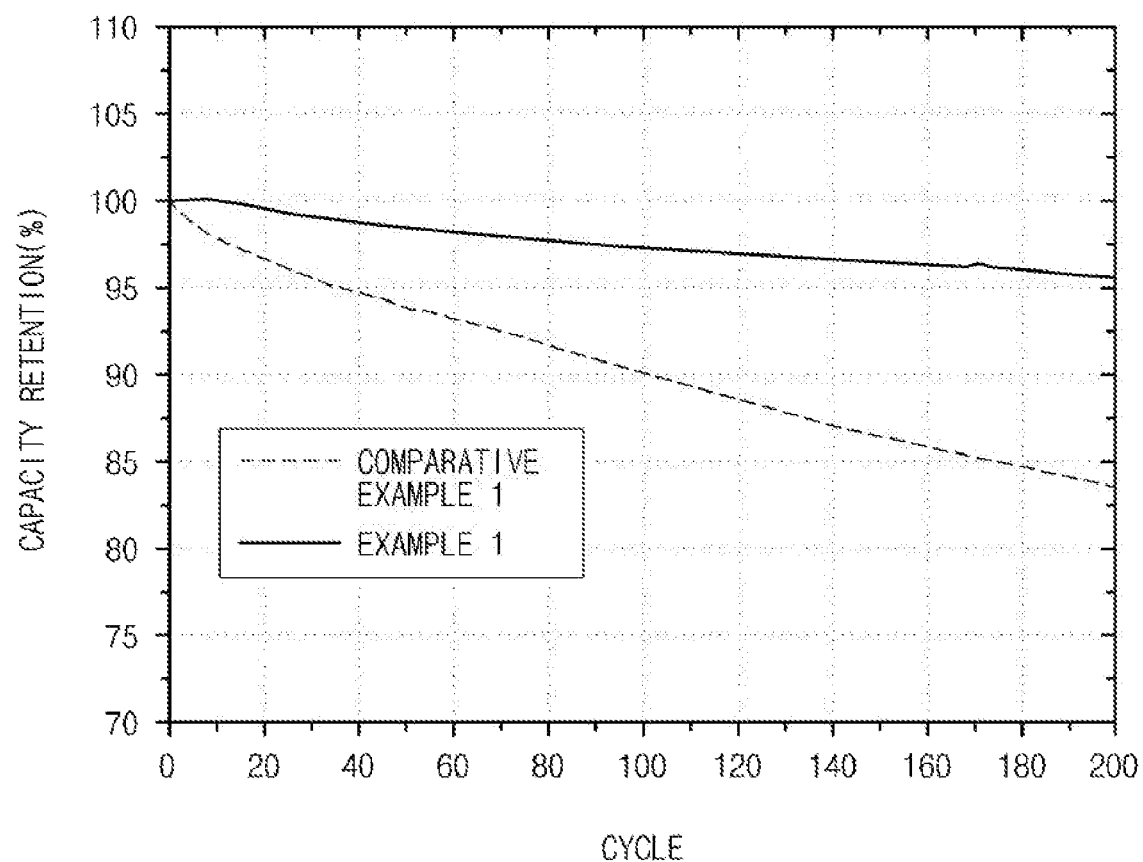
FIG. 6 is a graph illustrating evaluation results of capacity retention of lithium secondary batteries respectively including the positive electrode active materials of Example 1 and Comparative Example 1.

The lithium secondary batteries manufactured in Example 1 and Comparative Example 1 were charged and discharged 200 times at a high temperature (45° C.) under conditions of 0.5 C/0.5 C within a driving voltage range of 3.0 V to 4.3 V, and each capacity retention, as a ratio of discharge capacity in a 200$^{th}$ cycle to initial capacity, was measured. The results thereof are presented in FIG. 6.

From the experimental results, the capacity retention in the 200$^{th}$ cycle of the lithium secondary battery manufactured in Example 1 was higher than that of Comparative Example 1, and thus, it may be confirmed that the lithium secondary battery manufactured in Example 1 had better life characteristics.

EXPERIMENTAL EXAMPLE 3

Thermal Stability Evaluation

Thermal stability was evaluated for the lithium secondary batteries manufactured in Example 1 and Comparative Example 1.

Figure 7:
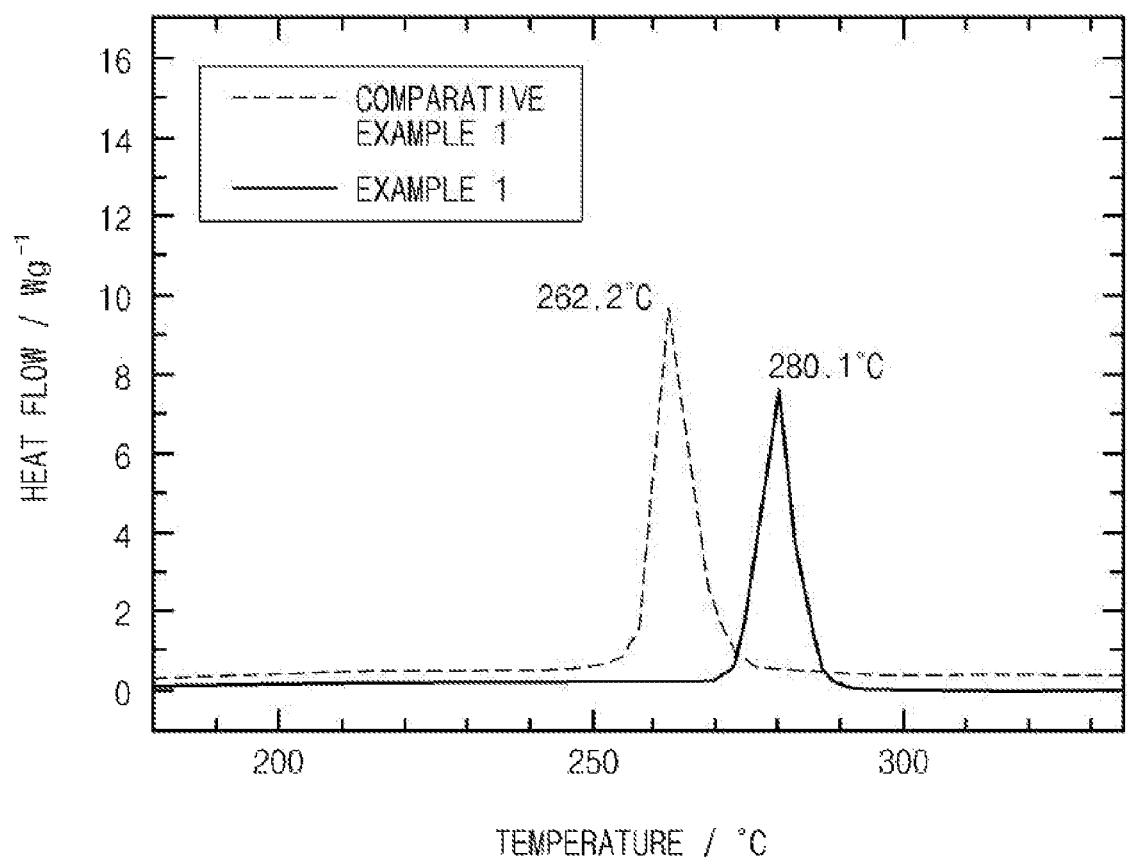
FIG. 7 is a graph illustrating evaluation results of thermal stabilities of the lithium secondary batteries respectively including the positive electrode active materials of Example 1 and Comparative Example 1.

Specifically, after the lithium secondary batteries manufactured in Example 1 and Comparative Example 1 were charged at 4.3 V, positions of exothermic peaks were identified by heating at a rate of 10° C./min using a differential scanning calorimeter (DSC). The results thereof are presented in FIG. 7.

From the experimental results, with respect to the lithium secondary battery of Example 1 including the positive electrode active material according to the present invention, the position of the exothermic peak moved to a higher temperature in comparison to Comparative Example 1 which did not have a concentration gradient and did not include a rod-shaped particulate in the intermediate layer, and thus, it may be confirmed that the lithium secondary battery of Example 1 had better thermal stability.

The invention claimed is:
1. A positive electrode active material for a lithium secondary battery, the positive electrode active material comprising:

a secondary particle core formed by agglomeration of primary particles of a nickel manganese cobalt-based first lithium composite metal oxide;

an intermediate layer disposed on the core and including rod-shaped nickel manganese cobalt-based second lithium composite metal oxide particles radially oriented from a center of an active material particle to a surface thereof; and a shell disposed on the intermediate layer and including a nickel manganese cobalt-based third lithium composite metal oxide.

2. The positive electrode active material for a lithium secondary battery of claim 1, wherein the primary particles of the nickel manganese cobalt-based first lithium composite metal oxide included in the core have at least one shape of a granular shape and a rod shape.

3. The positive electrode active material for a lithium secondary battery of claim 1, wherein the primary particles of the nickel manganese cobalt-based first lithium composite metal oxide included in the core have a rod shape and do not have an orientation.

4. The positive electrode active material for a lithium secondary battery of claim 1, wherein the nickel manganese cobalt-based second lithium composite metal oxide particles included in the intermediate layer have an aspect ratio of greater than 1 and equal to or less than 20.

5. The positive electrode active material for a lithium secondary battery of claim 1, wherein at least one metallic element of the nickel, the cobalt, and the manganese included in the positive electrode active material has a concentration gradient in which a concentration of the at least one metallic element of the nickel, the cobalt, and the manganese is increased or decreased from the center of the positive electrode active material particle to an interface between the intermediate layer and the shell; or from the center of the positive electrode active material particle to the surface thereof.

6. The positive electrode active material for a lithium secondary battery of claim 1, wherein a concentration of the nickel included in the positive electrode active material is continuously decreased from the center of the positive electrode active material particle to an interface between the intermediate layer and the shell.

7. The positive electrode active material for a lithium secondary battery of claim 1, wherein a concentration of the cobalt included in the positive electrode active material is continuously increased from the center of the positive electrode active material particle to an interface between the intermediate layer and the shell.

8. The positive electrode active material for a lithium secondary battery of claim 1, wherein a concentration of the manganese included in the positive electrode active material is continuously increased from the center of the positive electrode active material particle to an interface between the intermediate layer and the shell.

9. The positive electrode active material for a lithium secondary battery of claim 1, wherein the nickel, the cobalt, and the manganese included in the shell each independently have a constant concentration value over the entire shell.

10. The positive electrode active material for a lithium secondary battery of claim 1, wherein, when a thickness of the core is defined as a distance from the center of the positive electrode active material particle to an interface between the core and the intermediate layer, a thickness of the intermediate layer is defined as a distance from the interface between the core and the intermediate layer to an interface between the intermediate layer and the shell, and a thickness of the shell is defined as a distance from the interface between the intermediate layer and the shell to the surface of the positive electrode active material particle, the core has a thickness of 3% to 30% of an average particle diameter of the positive electrode active material, and the intermediate layer and the shell are formed to have a thickness ratio of 1:0.01 to 1:1.

11. The positive electrode active material for a lithium secondary battery of claim 1, wherein the first to third lithium composite metal oxides each independently comprise the nickel in an amount of 50 at % based on a total atomic weight of nickel, cobalt, and manganese elements which are included in the oxide, and a difference between average concentrations of the nickel in the core and the shell is in a range of 10 at % to 45 at %.

12. A method of preparing the positive electrode active material for a lithium secondary battery of claim 1, the method comprising:

preparing a metal salt solution for forming a core which includes nickel, cobalt, and manganese, and a metal salt solution for forming a shell which includes nickel, cobalt, and manganese in a concentration different from that of the metal salt solution for forming a core;

preparing a positive electrode active material precursor by adding a chelating agent and a basic aqueous solution as well as the metal salt solution for forming a shell to the metal salt solution for forming a core to allow a mixing ratio of the metal salt solution for forming a core to the metal salt solution for forming a shell to be gradually changed from 100 vol %:0 vol % to 0 vol %:100 vol %; and mixing the positive electrode active material precursor with a lithium salt and performing a heat treatment, wherein, during the preparation of the positive electrode active material precursor, a feed rate of the metal salt solution for forming a shell added to the metal salt solution for forming a core is different for each of core, intermediate layer, and shell forming regions of the active material.

13. The method of claim 12, wherein, during the preparation of the positive electrode active material precursor, the feed rate of the metal salt solution for forming a shell added to the metal salt solution for forming a core is in a range of 10 g/min to 20 g/min, and the feed rate of the metal salt solution for forming a shell added to the metal salt solution for forming a core is increased within the feed rate range from the core forming region to the intermediate layer and shell forming regions.

14. The method of claim 12, wherein, during the preparation of the positive electrode active material precursor, the feed rate of the metal salt solution for forming a shell added to the metal salt solution for forming a core and a feed rate of the basic aqueous solution are a same, and a feed rate of the chelating agent is 5 times to 7 times lower than the feed rate of the metal salt solution for forming a shell.

15. The method of claim 12, wherein the preparing of the positive electrode active material precursor is performed in a pH range of 10 to 12.

16. The method of claim 12, wherein the heat treatment is performed in a temperature range of 800° C. to 1,100° C.

17. A positive electrode for a lithium secondary battery comprising the positive electrode active material of claim 1.

18. A lithium secondary battery comprising the positive electrode of claim 17.

\* \* \* \* \*